US008032610B2

(12) United States Patent
Zhu et al.

(10) Patent No.: US 8,032,610 B2
(45) Date of Patent: Oct. 4, 2011

(54) SCALABLE HIGH-SPEED CACHE SYSTEM IN A STORAGE NETWORK

(76) Inventors: Yaolong Zhu, Beijing (CN); Hui Xiong, Beijing (CN); Jie Yan, Beijing (CN)

( * ) Notice: Subject to any disclaimer, the term of this patent is extended or adjusted under 35 U.S.C. 154(b) by 590 days.

(21) Appl. No.: 11/886,435

(22) PCT Filed: Mar. 14, 2006

(86) PCT No.: PCT/CN2006/000384
§ 371 (c)(1),
(2), (4) Date: Sep. 26, 2007

(87) PCT Pub. No.: WO2006/097037
PCT Pub. Date: Sep. 21, 2006

(65) Prior Publication Data
US 2008/0172489 A1    Jul. 17, 2008

(30) Foreign Application Priority Data
Mar. 14, 2005   (CN) .......................... 2005 1 0011424

(51) Int. Cl.
G06F 15/16 (2006.01)
G06F 15/173 (2006.01)
G06F 13/00 (2006.01)
G06F 13/28 (2006.01)
(52) U.S. Cl. .................... 709/217; 709/223; 711/118
(58) Field of Classification Search .................. 709/217, 709/223; 711/118
See application file for complete search history.

(56) References Cited
U.S. PATENT DOCUMENTS

| 6,640,278 | B1 * | 10/2003 | Nolan et al. ...................... 711/6 |
| 6,792,507 | B2 * | 9/2004 | Chiou et al. ................. 711/119 |
| 6,862,606 | B1 | 3/2005 | Major et al. |
| 7,287,125 | B2 * | 10/2007 | Kaneko et al. ................. 711/141 |
| 7,415,574 | B2 * | 8/2008 | Rao et al. ...................... 711/118 |
| 7,437,511 | B1 * | 10/2008 | Nguyen et al. ................ 711/120 |
| 7,472,231 | B1 * | 12/2008 | Cihla et al. ................... 711/144 |
| 2001/0049773 | A1 * | 12/2001 | Bhavsar ........................ 711/147 |
| 2002/0078299 | A1 * | 6/2002 | Chiou et al. .................. 711/119 |
| 2003/0079087 | A1 * | 4/2003 | Kuwata ......................... 711/136 |
| 2003/0158998 | A1 * | 8/2003 | Smith ........................... 711/112 |
| 2005/0027798 | A1 * | 2/2005 | Chiou et al. .................. 709/203 |
| 2005/0038850 | A1 * | 2/2005 | Oe et al. ....................... 709/203 |
| 2006/0026229 | A1 * | 2/2006 | Ari et al. ...................... 709/203 |

FOREIGN PATENT DOCUMENTS
CN           1138216      2/2004
EP           1489524 A1 * 12/2004
WO PCT/CN2006/000384    7/2006

* cited by examiner

Primary Examiner — George Neurauter
(74) Attorney, Agent, or Firm — Workman Nydegger

(57) ABSTRACT

The present invention discloses a scalable high-speed cache system in a storage network. It gives a solution to the bottleneck problem that the speed of seeking on the hard disk is slow, and realizes the high speed respondence to the input/output of the server. The present invention includes a high-speed cache system in a storage network which is constituted with at least one high-speed cache module which is connected to the network, a storage network manager constitutes with at least one storage network management module. The said storage network management module is constituted with hardware platform unit and software platform unit. The said hardware platform unit uses an embedded system platform or a server platform. The said high-speed cache system in a storage network is managed by the storage network manager, and it can be shared by the server and the disk storage system which is connected to the storage network.

9 Claims, 4 Drawing Sheets

SCALABLE HIGH-SPEED CACHE SYSTEM IN A STORAGE NETWORK

FIELD OF INVENTION

The invention is about a scalable cache system in a storage network, which is used in a storage network system and managed by the storage network manager.

RELATED ART

Scalability and consolidation of storage is an important trend in network storage industry. Most of current storage systems use the disk array as the storage device, which provide enough storage capacity and bandwidth.

However, due to the mechanical limits of hard disk drive (HDD), the seek time of HDD is about 10 ms. The I/O performance of a normal HDD only supports around 100 random I/O requests per second. Although by using the RAID technology which distributes the I/O requests to an array of disks, the I/O performance still limited to 1000s random IOps for a RAID system.

Many solutions have been proposed to solve low IO performance issue of storage system. The caching technology is one of the most effective solutions. Currently, most of caching technologies are based on the cache inside the server or disk array, as shown in FIG. 1. However, this architecture has an obvious limitation which the total cache capacity can not be expanded to TB level, and the cache can not be shared among storage systems. This invention discloses a new architecture of storage network cache system.

SUMMARY OF THE INVENTION

To overcome the shortcomings of existing technologies, this invention provides a scalable high-speed cache architecture in a storage network which can break the limit of random IO performance of storage.

A scalable high-speed cache system in a storage network which is disclosed in this invention, comprising: a High-Speed Cache System that consists of at least one High-Speed Cache Module connected to the storage network; a Storage Network Manager that consists of at least one Storage Network Management Module connected to the storage network; wherein said high speed cache module consists of Hardware Platform Units and Software Platform Units, wherein said Hardware Platform Units base on an embedded system platform or a server platform; wherein said High-speed Cache System is managed by said Storage Network Manager and is accessed by both servers and disk storage systems which are connected to the storage network.

The High-Speed Cache Module connected to the storage network includes hardware platform unit and software platform unit. The hardware platform unit bases on an embedded system or a server platform. With certain software platform unit setting, the High-Speed Cache Module in the storage network can be shared by servers and storage modules connected to the storage network. By using the memory instead of using the hard disks, this invention can provide very short response time to server IO requests.

The software platform unit includes software interface unit working at target mode, software interface unit working at host mode, a high-speed cache management unit and data transfer software unit, wherein said software interface units including device drivers for hardware interface cards, wherein said software interface unit working at target mode receiving data from server and said software interface unit working at host mode sending data to disk storage system, wherein said high-speed cache management unit mapping the data received from software interface units to said high-speed cache hardware units, wherein said data transfer software unit transferring the data from the server into disk storage system connected to the storage network, said data transfer software unit including a cache optimization module with some optimization algorithms which reduces data transferring frequency and capacity by merging data need to transferred to the disk storage system.

Furthermore, the hardware platform unit contains of CPU, hardware interface unit, high-speed cache hardware unit and data protection unit. In high-speed cache hardware unit, the software platform unit can make the internal memory or other extension memory resource a virtual hard disk in the storage network. Through the storage network management module, other servers and storage modules can use the virtual hard disk from the high-speed cache system as an internal cache. Through the setting of management module, the high-speed cache module can also access other storage modules in the network. Because storage network connects the high-speed cache modules and storage modules, the high-speed cache system is also a "transparent" storage device to servers. Data from server can go through the high-speed cache system, and finally, reach the persistent storage modules i.e. the disk storage systems. The platform can work more effectively, by setting the software platform unit and implement certain algorithms. For example, the software platform unit can adopt the cache algorithms to reduce the bandwidth usage. Furthermore, the storage network management module manages the entire network storage system, monitors storage modules (including the high-speed cache modules and storage modules). It can also control the data accessing path. For example, the random data request can be sent to high-speed cache module, and the sequential data requests can be directly passed to storage modules. By using this design, the overall random IOps can be improved significantly.

Therefore, the high-speed cache system in the storage network can be used as a high performance storage device to servers. Through the control of storage network manager, the high-speed cache modules can be shared by many servers, and the capacity of cache to each server can be adjusted dynamically. Also, because all the high-speed cache modules are connect to the network and independent to each other, the scalability of the cache module is only limited by the connectivity of the network.

DETAILED DESCRIPTION OF THE PREFERRED EMBODIMENT

Figure 1:
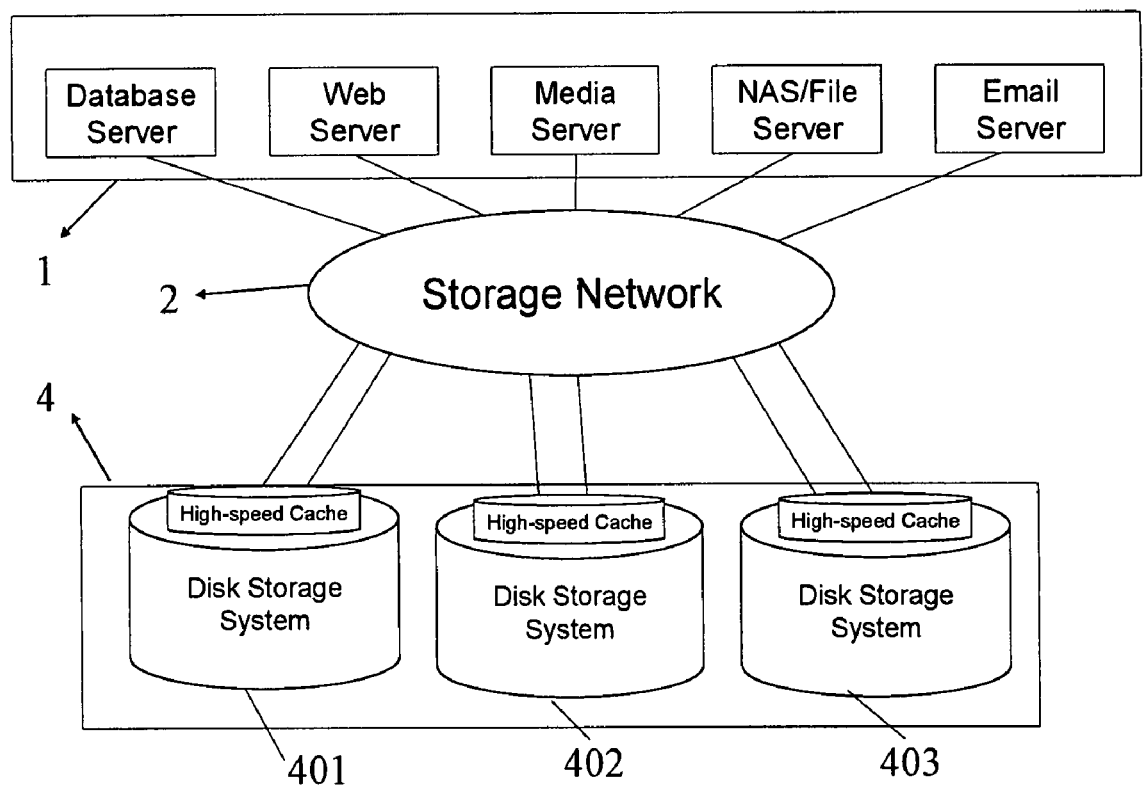
FIG. 1 shows the architecture of current storage system with cache.

FIG. 1 describes the existing storage network system architecture. Server 1 and disk storage system 4 are connected to a storage network 2. Each disk storage system, such as 401, 402 and 403, has a high-speed cache inside which can only be accessed by single disk storage system and cannot be shared with other disk storage system.

Figure 2:
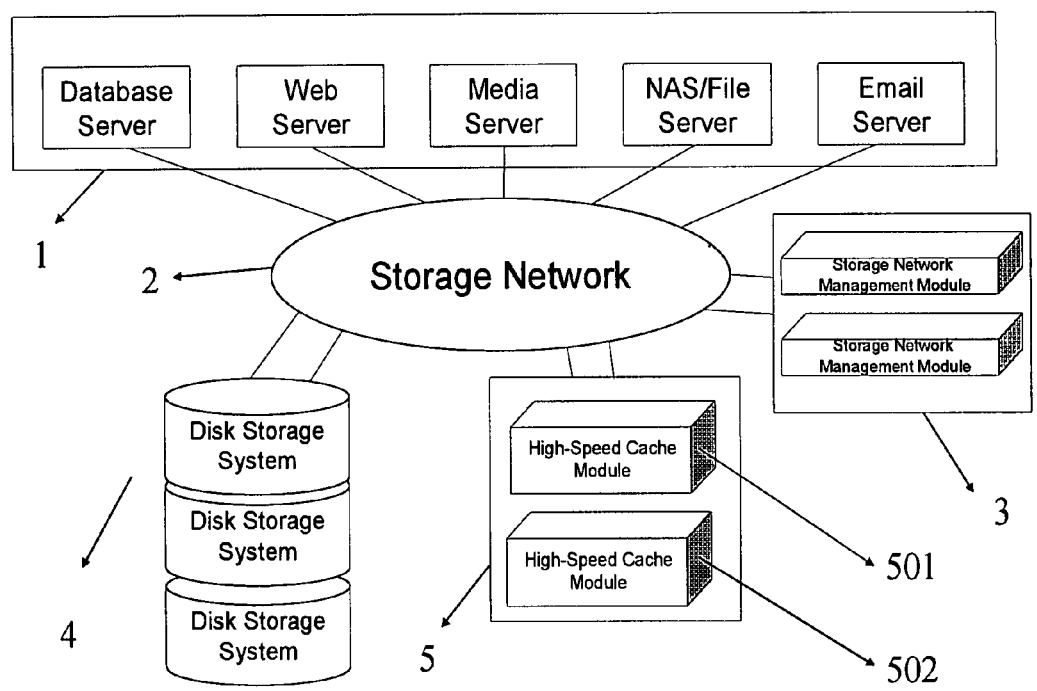
FIG. 2 shows the architecture of the invention.

FIG. 2 describes the system architecture and its operating mechanism in this invention. A variety of servers 1 and disk storage system 4, which is shown as three disk storage systems in FIG. 2, are connected to storage network 2. A cache system 5 which consists of cache modules and a storage network manager 3 which consists of storage network management modules are connected to the storage network 2. This figure only shows two storage network cache modules as 501 and 502. The system may be configured in the form of redundant array, such as mirroring or RAID5 (at least three storage network cache modules) for data storage, in order to improve the reliability of cache system. Two storage network management modules are shown in this figure. The storage network high-speed cache system 5, which consists of hardware platform units and software platform units, can be communicated with disk storage systems 4 via storage network 2. Said hardware platform units are based on the hardware resources of embedded system or server system. The storage network high-speed cache system 5 managed by storage network manager 3 can be accessed by both servers 1 and storage systems 4 which are connected to the storage network. The cache system can provide high-speed responses to server I/O requests since it is not restricted by disk mechanical structure. Furthermore, the cache system can be easily consolidated and expanded by adding more cache modules.

Figure 3:
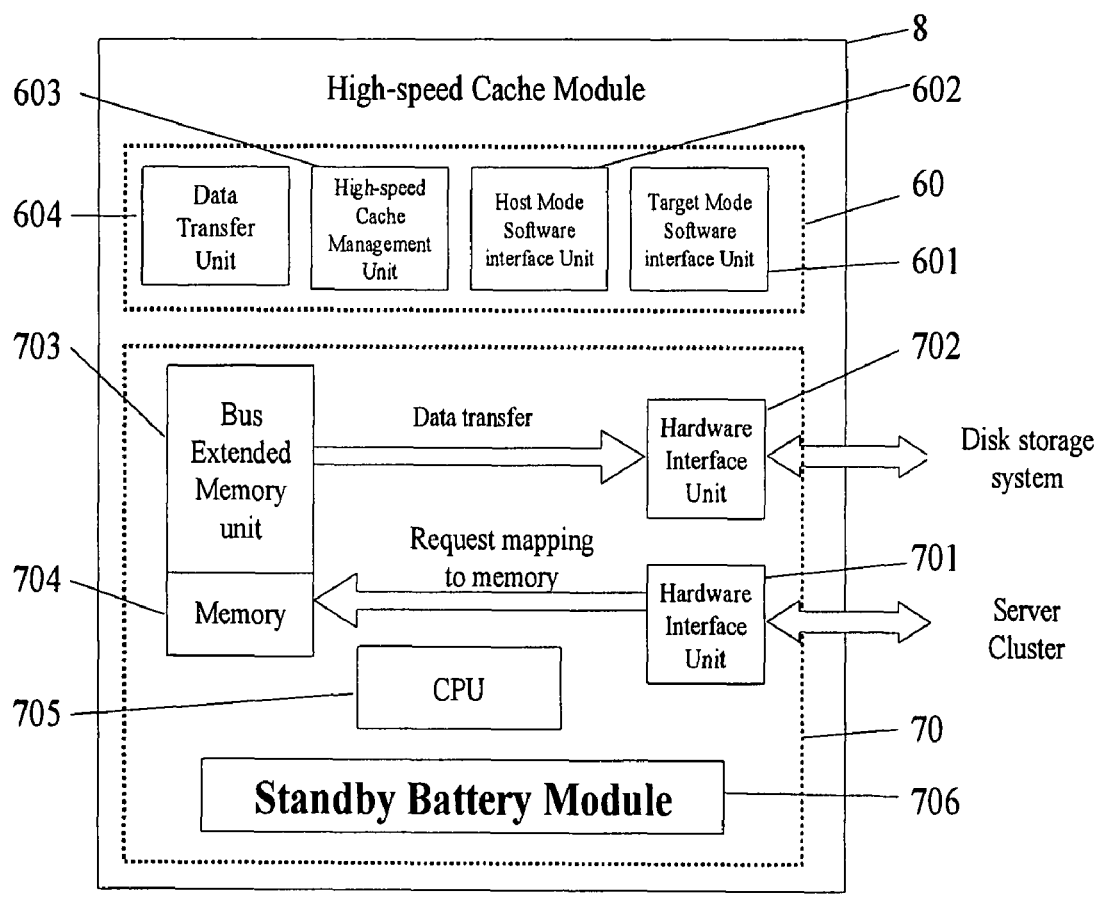
FIG. 3 shows a structure of a high-speed cache module disclosed in the invention.

FIG. 3 describes the structure of the high-speed cache module in the storage network. The high-speed cache module 8 in the storage network consists of hardware platform units 70 and software platform units 80. The hardware platform units 70 based on a server platform or an embedded platform consists of CPU 705, hardware interface units 701 and 702, high-speed cache hardware units including memory 703 and PCI-bus-expanded memory unit 704, and also data protection unit (Standby battery module 706). Hardware interface unit may support Fiber Channel interface or Ethernet Interface. Each high-speed cache module in the storage network has at least two storage network hardware interface units so that it supports the software interface units working in two different modes. The high-speed cache hardware units on the platform of server or embedded system bases on the large capacity memory of platform or the bus extended cache module. The standby battery module 706 is configured as data protection unit in the high-speed cache module 8 in the storage network. In the case of external power fails, the battery module can keep cache module working in order to transfer the data stored in the high-speed cache hardware units to the persistent disk storage system.

The software platform unit 60 in high-speed cache module 8 in the storage network consists of software interface unit 601 working in target mode, software interface unit 602 working in host mode, high-speed cache management unit 603, and Data transfer software unit 604. The two software interface units 601 and 602 are working as device drivers of hardware interface, so that the hardware interface units 701 and 702 can provide storage protocols of data block layer such as FCP or iSCSI, of file layer such as NFS and/or CIFS, and of object level such as OSD. One function of the software interface unit 601 working in target mode for hardware interface unit 701 is to make the high-speed cache module 8 appear as a storage device, from which servers can access data. One function of the software interface unit 602 working in host mode for hardware interface unit 702 is to make the high-speed cache module 8 appear as a server which can access data from disk storage systems connected in the storage network. The high-speed cache management unit 603 can be based on the non-system memory, or the mapped extended memory via PCI bus. The management of cache can base on the virtual memory file system (RAM File System) of the operating system, or virtual disk (RAM Disk). The function of the high-speed cache management unit 603 includes mapping the data received from software interface unit to the high-speed cache hardware unit (i.e. RAM File System or RAM Disk). The function of Data transfer software unit 604 is to exchange the data between cache module and disk storage system connected to the storage network. Data transfer Software Unit transfers the data from the server into disk storage system connected to the storage network. Data transfer Software Unit includes a Cache Optimization Module with some optimization algorithms which reduces data transferring frequency and capacity by merging data need to be transferred to the disk storage system. The specific approach is that the Data transfer software unit merges duplication written requests, writes the data of the last request to disk storage system, and therefore reduces frequency of data transferring. The Cache Optimization Module can also merge possible consecutive written requests, and write all data from consecutive requests to disk storage system by fewer operations.

The processing in FIG. 3 is as follows. IO requests from servers are sent to the high-speed cache module 8 in the storage network through hardware interface unit 701, and handled by the software interface unit 601 working in target mode. The software interface unit 601 sends data to cache management unit 603. The cache management unit 603 maps the data to memory. The Data transfer software unit 604 uses Optimization algorithm when writing data which has been mapped to memory to disk storage system through hardware interface unit 702 working at host mode.

The scalable high-speed cache system in storage network may include one or more cache module 8. The cache modules 8 connected to the storage network may be organized as Redundant Array (such as mirroring or RAID5).

The cache system in storage network of this invention has very high IO performance to random requests compared to the general disk storage system. The scalability of cache system is an important issue. The cache system in this invention is easily expanded by Storage Network Manager. The storage network manager includes a resource manager unit, a resource distributor unit, an extension manager unit and a data-flow controller unit. Wherein said resource manager unit manages the resource information all over the storage network such as the addresses and capability of the high-speed cache system in the storage network and disk storage system; Wherein said resource distributor unit assigns cache location for each server and/or disk storage system; Wherein said extension manager unit manages the extending operation of high-speed cache systems. If a high-speed cache module is added to or removed from the storage network, the storage network management module examines storage network resources changes automatically, and then merges the high-speed cache module into cache system with certain algorithms. Wherein said data-flow controller unit manages the data transferring between server and cache, the data transferring between server and disk storage system, and the data transferring between disk storage system and cache; wherein said data-flow controller unit decides the data flow direction according to the type of data access requests, said data flow controller unit includes a data transferring policy which to interchange the data between server and high-speed cache system for Random data access requests and to interchange the data between server and disk storage system for continuous data access requests.

The storage network manager includes an automatic test module which stores current state information of all modules connected to the storage network, sends commands to different devices from time to time. According to the response received, the automatic test module can determine whether the module is working normally or disconnected.

Figure 4:
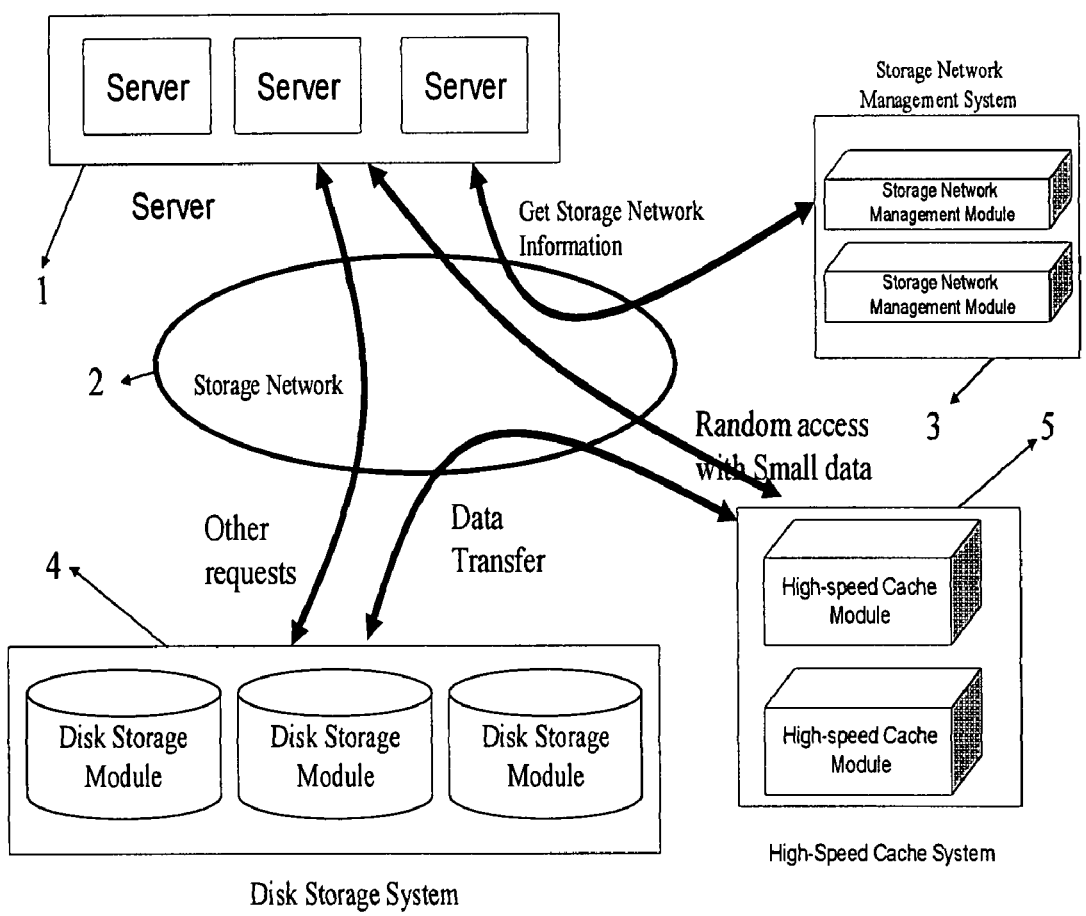
FIG. 4 shows the storage network with the invented cache system.

FIG. 4 describes one typical data-flow in the cache system. Server 1 directs the random access requests to the high-speed cache system 5 and other requests to disk storage system 4, according to information received from storage network manager 3. The high-speed cache system 5 and disk storage system 4 are connected in storage network 2. All data which is written into the cache system 5 will be transferred onto disk storage system 4. In this Figure, the cache system 5 and the storage network manager 3 are both configured as mirror.

What is claimed is:

1. A scalable high-speed cache system in a storage network, comprising:
   a high-speed cache system having at least one high-speed cache module connected to the storage network;
   a storage network manager having at least one storage network management module connected to the storage network;
   wherein said high speed cache module includes a hardware platform unit and a software platform unit, wherein said hardware platform unit is based on an embedded system platform or a server platform;
   wherein said high-speed cache system is managed by said storage network manager and is accessed by both servers and disk storage systems which are connected to the storage network
   wherein said storage network management module includes a data-flow controller unit, said data-flow controller unit decides a data flow direction according to a type of data access requests, said data flow controller unit includes a data transferring policy to interchange the data between the servers and the hiqh-speed cache system for Random data access requests and to interchange the data between the servers and the disk storage systems for continuous data access requests.

2. A system as claimed in claim 1, wherein said hardware platform unit comprises a CPU, a hardware interface unit, a high-speed cache hardware unit and a data protection unit.

3. A system as claimed in claim 2, wherein said hardware interface unit includes one of a fiber channel interface and an Ethernet interface.

4. A system as claimed in claim 2, wherein said high-speed cache hardware unit includes a system memory of the server platform or the embedded system platform, and the expanded memory resources of the server platform or the embedded system platform through a system bus.

5. A system as claimed in claim 2, wherein said data protection unit is the standby battery module configured in said hardware platform unit.

6. A system as claimed in claim 2, wherein said software platform unit includes a software interface unit working at a target mode, a software interface unit working at a host mode, a high-speed cache management unit and a data transfer software unit;
   wherein said two software interface units includes device drivers for the hardware interface unit ;
   wherein said software interface unit working at the target mode receives data from the servers and said software interface unit working at the host mode sends data to the disk storage systems;
   wherein said high-speed cache management unit maps the data received from the software interface unit to said high-speed cache hardware unit;
   wherein said data transfer software unit transfers the data from the servers into the disk storage systems connected to the storage network, said data transfer software unit includes a cache optimization module with some optimization algorithms which reduces data transferring frequency and capacity by merging data needed to be transferred to the disk storage systems.

7. A system as claimed in claim 1, wherein said storage network management module includes a resource manager unit, a resource distributor unit, an expanding manager unit and a data-flow controller unit;
   wherein said resource manager unit manages the resource information all over the storage network;
   wherein said resource distributor unit assigns a cache location for each server and/or disk storage system;
   wherein said expanding manager unit manages an expanding operation of high-speed cache modules; and
   wherein said data-flow controller unit manages the data transferring between the servers and the high-speed cache system, the data transferring between the servers and the disk storage systems, and the data transferring between the disk storage systems and the high-speed cache system.

8. A system as claimed in claim 7, further comprising two storage network management modules which are configured to support mirroring function.

9. A system as claimed in claim 7, further comprising two and more cache modules which are configured to support a redundant array.

* * * * *